March 31, 1953    J. E. CRUSE ET AL    2,633,067
CONNECTOR ELEMENT FOR TRACTOR HITCH MEMBERS
Filed July 13, 1950
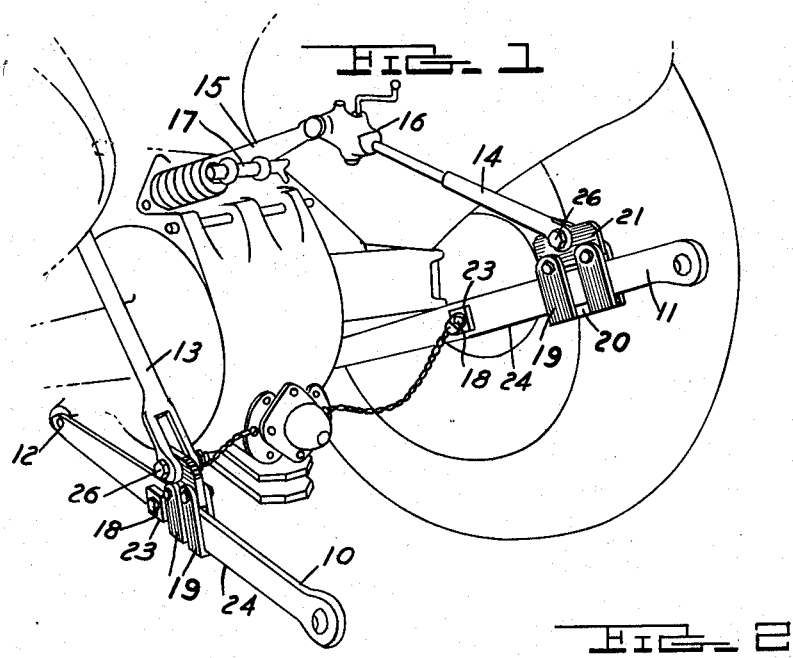
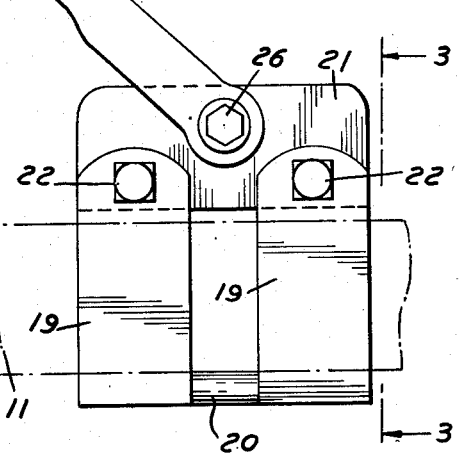
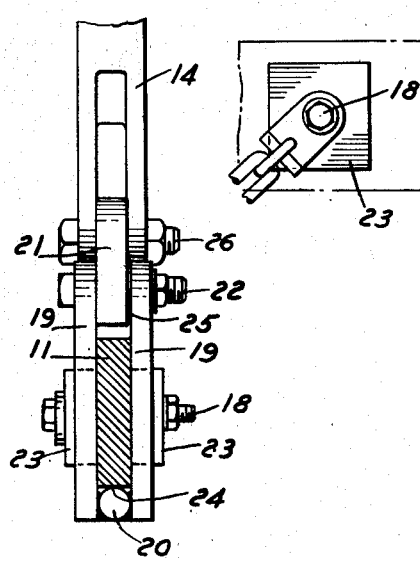
INVENTORS
JOSEPH E. CRUSE
JOE VLACH JR.
BY
Farley Forster & Farley
ATTORNEYS Patented Mar. 31, 1953

2,633,067

UNITED STATES PATENT OFFICE 2,633,067

CONNECTOR ELEMENT FOR TRACTOR HITCH MEMBERS

Joseph E. Cruse, Omaha, and Joe Vlach, Jr., Lincoln, Nebr.

Application July 13, 1950, Serial No. 173,622

4 Claims. (Cl. 97—50)

This invention relates to an element for interconnecting a lifting link and a pulling member or draw bar of a lift-type tractor hitch.

In most hitches of this type, pulling members are each pivotally connected at some point on the tractor structure at one end and are adapted to have their outer end connected to the implement to be drawn. For lifting, these pulling members are also customarily connected by a link to a crank on a rock shaft carried by the tractor so that when the rock shaft and crank are rotated, a pivotal movement of the pulling members is accomplished to change the level of their outer ends. In some constructions, a hydraulic cylinder may be used as a direct acting lifting link.

The exact nature of the invention can be more clearly understood from a brief reference to Fig. 1 of the accompanying drawings which illustrates the essential elements of a hitch of this type as embodied in the well-known Ford tractor. This specific form of lift-type hitch employs a pair of lower pulling members 10 and 11 each pivotally connected to the tractor structure at a point 12 and each connected by one of a pair of links 13 and 14 to cranks 15 carried by a rockable shaft (not shown) which extends transversely of the tractor within its housing structure. The right hand link 14 is adjustable in length by a crank mechanism 16 for transverse leveling. In the conventional commercial construction, the links 13 and 14 are each connected at a fixed point to the pulling members 10 and 11 respectively, and since the cranks 15 are keyed to the rockable shaft, the relative level of the outer ends of the members 10 and 11 is for all practical purposes the same, except, of course, for the adjustment obtained through the leveling mechanism 16. When the tractor is operated with a soil working implement, the level of the latter, in a transverse direction to the line of travel, is effected by the transverse level of the tractor at any particular moment. Thus, if one wheel of the tractor momentarily passes over a rut or ridge, this change in level which takes place at the tractor rear axle will necessarily be transmitted back to the implement to produce a corresponding effect in its soil working action or depth of penetration. The effect on the implement of the change in level of the tractor may not necessarily be of the same magnitude as the simultaneous change in level of the tractor but some degree of uneven soil penetration will result. Furthermore, with a hitch mechanism of the type employed on the Ford tractor where the soil penetration of certain implements can be controlled as a function of the implement draft, this variation in implement level will, of course, produce draft changes and cause undesirable operation of the tractor control mechanism due to the fact that the corrective action of the tractor draft control will necessarily occur after the time a momentary change in implement level takes place, and thus the draft control will tend to produce corrective action when the same is not really needed or to a different extent than that actually required at that instant.

The present invention involves the use of a simple connector element between a tractor pulling arm and lifting linkage, which will permit transverse flexibility of an implement relative to the tractor but without sacrificing any of the advantages obtained from the operation of the lifting and/or implement depth control features obtainable from the tractor's hitch mechanism.

The form of the invention disclosed and to be described herein has been designed to provide these advantages with the hitch mechanism of the Ford tractor. As can be seen from this disclosure, the invention consists essentially of the assembly or combination of a device adapted to be pivotally connected to the tractor lifting link and to embrace the pulling arm of the tractor for free relative movement longitudinal thereof, and stop means to limit the extent of this movement so that first, the maximum depth of penetration of the implement will not ordinarily exceed that determined by the position of the tractor hitch mechanism and second, so that the implement can be raised by conventional operation of the tractor hitch mechanism.

In the accompanying drawings,

Fig. 1 is a three-quarter perspective elevation of the rear of a Ford tractor outlining the main housing thereof and showing the pulling arms and lifting links joined by the connector element of the invention;

Fig. 2 is a view in elevation showing the portion of the right-hand pulling arm of Fig. 1 engaged by the connector element of the invention; and Fig. 3 is a sectional elevation taken along the line 3—3 of Fig. 2.

The construction of the Ford tractor and its hitch mechanism is well understood and, of course, most of the essential elements thereof have been previously indicated. In addition to those mentioned, it might be well to point out that this particular type of lift hitch and implement control system also employs an upper connecting arm which is not shown in the drawings but which extends from a flexibly mounted connector pin 17 on the rear of the tractor to a point on the implement which is usually above and midway between the points to which the lower arms 10 and 11 are attached. This combination of upper and lower connecting arms in effect joins the implement to the tractor as a unit and to that extent increases the necessity for relative flexibility between the tractor and implement during ground working operations. The use of this upper arm, however, does not effect the operation of the connector element of the invention due to the fact that the upper arm is pivotally connected to both the tractor and the implement and due to the fact that in conventional commercial practice, this pivotal connection is of a swiveling or universal type which will not interfere with relative transverse motion between tractor and implement.

Conventionally, in this hitch mechanism, the lifting links 13 and 14 are attached to the lower pulling arms 10 and 11 by a bolt located in the same position as the bolt 18 shown in the drawings so that the level of the outer ends of the arms 10 and 11 is fixed by the angular position of the cranks 15.

The connector element of the invention, which provides a substitute point of connection for the links 13 and 14, consists of a yoke, adapted to slidably engage a pulling arm and comprised in the construction illustrated, of two pairs of plates 19, one pair being positioned on either side of a bottom member 20 with each plate being welded thereto. At their upper ends, the plates 19 are joined to an intermediate member 21 by transverse bolts 22 interconnecting one plate of each pair to the opposite plate of the other pair. One of the functions of this intermediate member is to prevent the yoke assembly from tipping, so that the bottom member 20 will always be substantially parallel to the under surface of the pulling arm.

A suitable stop consisting of a pair of rectangular members 23 is employed in combination with each connector element, these stop members being attached to the pulling arm 11 by the bolt 18.

In employing the device, and referring by way of example to the arm 11 of Fig. 1, the lifting link 14 is disconnected from its usual point of attachment to the arm 11 and the bolt 18 is employed to secure a pair of stop members 23 to the arm 11 at that point.

Assuming the connector device itself to be in a disassembled condition, the plates 19 are positioned on either side of the arm 11 with the bottom member 20 contacting the lower or under surface 24 thereof. The upper intermediate member 21 is then positioned between the plates 19 and connected thereto by the bolts 22 and suitable spacer washers 25, if required, so that the plates 19 clear the arm 11 for free sliding movement. The link 14 is connected to the member 21 by a bolt 26 which is not drawn so tight as to interfere with free pivotal movement at this point of connection. Thus, within the limits defined by the length of the link 14 and the position of the stops 23, the device provides a free sliding connection between the link and the tractor pulling arm. In the form of device disclosed, the bottom member 20 thereof is round in cross-section to limit the amount of contacting area between the device and pulling arm, and, when the device is forward against the stops 23, bolts 18 and 26 are substantially equidistant from the point of connections between the lifting link 13 or 14 and its crank 15 so that the normal limits of pivotal movement of the pulling arms are not affected.

For best operating results, each device should find a position along the pulling member somewhere intermediate its inner and outer limits of sliding movement when the implement attitude is the same transversely as that of the tractor and the implement has been lowered for normal soil penetration. This position of the device is between the positions of the left and right hand devices illustrated in Fig. 1 of the drawings. Then, each device is free to move inwardly or outwardly on its pulling arm with upward or downward movement of the tractor wheels.

In cases where the implement is only partially lowered for a restricted amount of soil penetration, the devices are positioned against the stops 23 when tractor and implement are at the same transverse level, but will be free to move rearwardly on the pulling arms to prevent this depth of penetration from being exceeded when a tractor wheel drops in a low spot. Thus, the device gives a certain independence of movement between the left and right hand pulling members, which may vary in degree according to operating conditions, but which provides transverse flexibility between the implement and a tractor whose lifting links intersect the pulling arms at an acute angle and are normally directly connected thereto. This independence of movement is also a distinct advantage in attaching the implement to the tractor, and has no effect upon the normal operation of the hitch in raising the implement, for then the devices will, of course, abut against the stop members 23 and the lifting links 13 and 14 will operate in their normal manner.

In devices constructed to date, it has not been found necessary to employ a more elaborate construction than that described for the purpose of minimizing the friction between the device and the tractor pulling arms in order to provide the freedom of relative movement necessary for proper operation. It is also felt that the form of device disclosed is preferable to any obvious alternate means for replacing the conventional interlock between the right and left hand tractor pulling arms such as, for example, by varying the type of connection employed between the cranks 15 and the rockable shaft.

If, for any reason, it becomes desirable to connect the lifting links 13 and 14 in the conventional manner, it is merely necessary to remove the bolts 18 and stops 23, disconnect the link from the device by removing the bolt 26 and connect the link in its conventional position by this same bolt. The device can be left in position on the pulling arm without interfering with the customary operation of the tractor hitch system or any conventional implement attached thereto.

We claim:

1. A connector element for use with a tractor lift hitch construction of the type having a hitch arm pivotally connected at one end to the tractor, a rockable actuating crank, and a link connected at one end to said crank and having its other end normally connected to said hitch arm at a point intermediate the ends thereof; said connector element comprising a stop member adapted to be connected to said hitch arm at the said normal point of connection of said link thereto, and a device adapted to slidably engage said hitch arm between the outer end thereof and said stop member, said device including means for pivotally connecting said link thereto.

2. The invention set forth in claim 1 wherein said device comprises a lower member adapted to contact the undersurface of said arm, means for limiting the area of surface contact between said lower member and said arm, upstanding plates secured to said member, an upper intermediate member detachably secured to said plates and means for pivotally connecting said link to said upper intermediate member.

3. The invention set forth in claim 1 wherein said means for pivotally connecting said link to said device and said normal point of connection of said link to said hitch arm are substantially equidistant from the point of connection of said link to said crank when said device is in contact with said stop member.

4. The invention set forth in claim 1 wherein said device includes a yoke member having surfaces adapted to slidably engage the side and bottom surfaces of said hitch arm and an upper intermediate member positioned between said yoke member and detachably secured thereto, said upper intermediate member including said means for the pivotal connection of said link to said device.

JOSEPH E. CRUSE.
JOE VLACH, Jr.

REFERENCES CITED

The following references are of record in the file of this patent:

UNITED STATES PATENTS

| Number | Name | Date |
|---|---|---|
| 69,553 | Fargo | Oct. 8, 1867 |
| 1,248,592 | Anderson | Dec. 4, 1917 |
| 2,180,124 | Smith | Nov. 14, 1939 |
| 2,186,620 | Aprea et al. | Jan. 9, 1940 |
| 2,306,744 | Morkoski | Dec. 29, 1942 |
| 2,383,386 | Hipple | Aug. 21, 1945 |
| 2,503,522 | Struthers et al. | Apr. 11, 1950 |